United States Patent
Chen et al.

(10) Patent No.: US 9,846,499 B2
(45) Date of Patent: Dec. 19, 2017

(54) TOUCH PANEL AND TOUCH DETECTION CIRCUIT

(71) Applicant: Marvell World Trade Ltd., St. Michael (BB)

(72) Inventors: Yexin Chen, Shanghai (CN); Wei Hou, Shanghai (CN); Haiqing Zhang, Shanghai (CN); Tao Shui, Cupertino, CA (US); Yonghua Song, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 6 days.

(21) Appl. No.: 14/724,261

(22) Filed: May 28, 2015

(65) Prior Publication Data

US 2015/0346889 A1 Dec. 3, 2015

Related U.S. Application Data

(60) Provisional application No. 62/005,509, filed on May 30, 2014.

(51) Int. Cl.
  *G06F 3/045* (2006.01)
  *G06F 3/041* (2006.01)
  *G06F 3/044* (2006.01)

(52) U.S. Cl.
  CPC ............ *G06F 3/0412* (2013.01); *G06F 3/044* (2013.01); *G06F 3/045* (2013.01); *G06F 3/0416* (2013.01); *G06F 2203/04101* (2013.01); *G06F 2203/04104* (2013.01); *G06F 2203/04106* (2013.01); *G06F 2203/04111* (2013.01); *G06F 2203/04112* (2013.01); *G06F 2203/04113* (2013.01)

(58) Field of Classification Search
  CPC ....................................... G06F 3/0412
  USPC ............................................. 34/174
  See application file for complete search history.

(56) References Cited

U.S. PATENT DOCUMENTS

| | | |
|---|---|---|
| 8,432,170 B1 | 4/2013 | Walsh et al. |
| 2009/0213090 A1* | 8/2009 | Mamba ............... G06F 3/044 345/174 |
| 2011/0007030 A1 | 1/2011 | Mo et al. |
| 2011/0187676 A1* | 8/2011 | Chang ............... G06F 3/044 345/174 |
| 2012/0044193 A1 | 2/2012 | Peng et al. |
| 2012/0262409 A1* | 10/2012 | Tsai ............... G06F 3/044 345/174 |

(Continued)

OTHER PUBLICATIONS

European Communication pursuant to Rule 69 EPC dated Mar. 21, 2016 in Patent Application No. 15169603.6.

(Continued)

*Primary Examiner* — Jason Olson

(57) ABSTRACT

Aspects of the disclosure provide a touch panel having an electrode array. The electrode array includes first electrodes arranged on a first layer, each first electrode patterned to include a plurality of sequentially connected first electrode elements that are generally shaped as elongated polygons, and second electrodes arranged on a second layer, each second electrode patterned to include a plurality of sequentially connected second electrode elements that are generally shaped as elongated polygons, wherein the first electrodes on the first layer and the second electrodes on the second layer are arranged over one another so as to form an interlocking pattern.

10 Claims, 9 Drawing Sheets

(56) References Cited

U.S. PATENT DOCUMENTS

2015/0042909 A1* 2/2015 Sekiguchi ............. G06F 3/0412
                                                 349/12
2015/0091862 A1* 4/2015 Bertrand ................ G06F 3/044
                                                 345/174

OTHER PUBLICATIONS

Partial European Search Report dated Nov. 9, 2015 in Patent Application No. 15169603.6.
Extended European Search Report dated Feb. 12, 2016 in Patent Application 15169603.6.
Extended European Search Report dated Feb. 17, 2017 in Patent Application No. 16193979.8.

* cited by examiner

TOUCH PANEL AND TOUCH DETECTION CIRCUIT

INCORPORATION BY REFERENCE

This present disclosure claims the benefit of U.S. Provisional Application No. 62/005,509, "Capacitive Touch Screen" filed on May 30, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A touch screen in a computer system includes an array of addressable electrodes. When a finger or a conductive stylus approaches an electrode, it disturbs the electric field and alters the capacitance at the electrode. The capacitance variation can be measured by a touch detection circuit and subsequently converted into a coordinate that is supplied to the computer system.

SUMMARY

Aspects of the disclosure provide a touch panel having an electrode array. The electrode array includes first electrodes arranged on a first layer, each first electrode patterned to include a plurality of sequentially connected first electrode elements that are generally shaped as elongated polygons, and second electrodes arranged on a second layer, each second electrode patterned to include a plurality of sequentially connected second electrode elements that are generally shaped as elongated polygons, wherein the first electrodes on the first layer and the second electrodes on the second layer are arranged over one another so as to form an interlocking pattern.

In an embodiment, the first electrode elements on the first layer and the second electrode elements on the second layer are hexagon-shaped. In an alternative embodiment, the first electrode elements on the first layer and the second electrode elements on second layer are hollowed-hexagon-shaped. In an example of the alternative embodiment, a first hollow area inside the hollowed hexagon of the first and second electrode elements and a second hollow area between the adjacent hollowed hexagons of the first and second electrode elements include suspended blocks. In another example, the suspended blocks in each of the first hollow areas and the second hollow areas includes a plurality of suspended blocks. In a further example, the suspended blocks are coplanar with either one of the first layer or the second layer.

In an embodiment, at least one of the electrodes includes an extra branch in a middle portion of the electrode. In another embodiment, the first electrodes on the first layer and the second electrodes on the second layer are coplanar with each other.

In an embodiment, the touch panel includes a display, wherein the electrode array is positioned in front of the display. In an alternative embodiment, the touch panel includes a display, wherein the electrode array is integrated into the display.

Aspects of the disclosure provide a touch controller. The touch controller has a touch detection circuit that is configured to receive signals indicative of touches on a touch panel and determine coordinates of the touches. The touch detection circuit includes an analog front-end configured to convert the signals indicative of touches on the touch panel to digital signals. The analog front-end includes a hybrid sensing circuit configured to generate a voltage signal based on the received signals indicative of touches on the touch panel. The hybrid sensing circuit operates in at least a first mode where the hybrid sensing circuit operates as a self-capacitance sensing circuit and a second mode where the hybrid sensing circuit operates as a mutual capacitance sensing circuit. The touch detection circuit further includes a digital signal processor configured to determine coordinates of the touches based on the digital signals received from the analog front-end.

In an embodiment, the hybrid sensing circuit has a set of switches that are configured to change an operation of the hybrid sensing circuit between the first mode and the second mode.

In another embodiment, while the hybrid sensing circuit operates in the first mode, the self-capacitance hybrid sensing circuit includes a voltage divider circuit including a first capacitor configured to have a fixed capacitance and a self-capacitance capacitor of an electrode in the touch panel serially connected with the first capacitor. In an example, while the hybrid sensing circuit operates in the first mode, the self-capacitance sensing circuit further includes an operational amplifier with a feedback capacitor and a feedback resistor, and the feedback capacitor and the feedback resistor are coupled between a converting input terminal and an output terminal of the operational amplifier; further, the self-capacitance sensing circuit includes a resistor having a first terminal coupled to the voltage divider circuit between the first capacitor and the self-capacitance capacitor and a second terminal coupled to the converting input terminal of the operational amplifier. In an embodiment, the resistor having a first terminal coupled to the voltage divider circuit is configured to have a large resistance such that current from the voltage divider circuit can be neglected for proper operation of the voltage divider circuit.

Aspects of the disclosure provide a method for operating a touch panel in two modes of operation with a hybrid sensing circuit. The method includes: sensing a touch on the touch panel with the hybrid sensing circuit configured to operate in a first mode of operation, switching the hybrid sensing circuit to a second mode of operation, and sensing the touch on the touch panel with the hybrid sensing circuit operating in the second mode of operation.

Embodiments of the method includes operating a touch panel in two modes of operation with a hybrid sensing circuit, wherein the first mode of operation is one of sensing self-capacitance changes or sensing mutual capacitance changes, and the second mode of operation is the other of sensing self-capacitance changes or sensing mutual capacitance changes.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
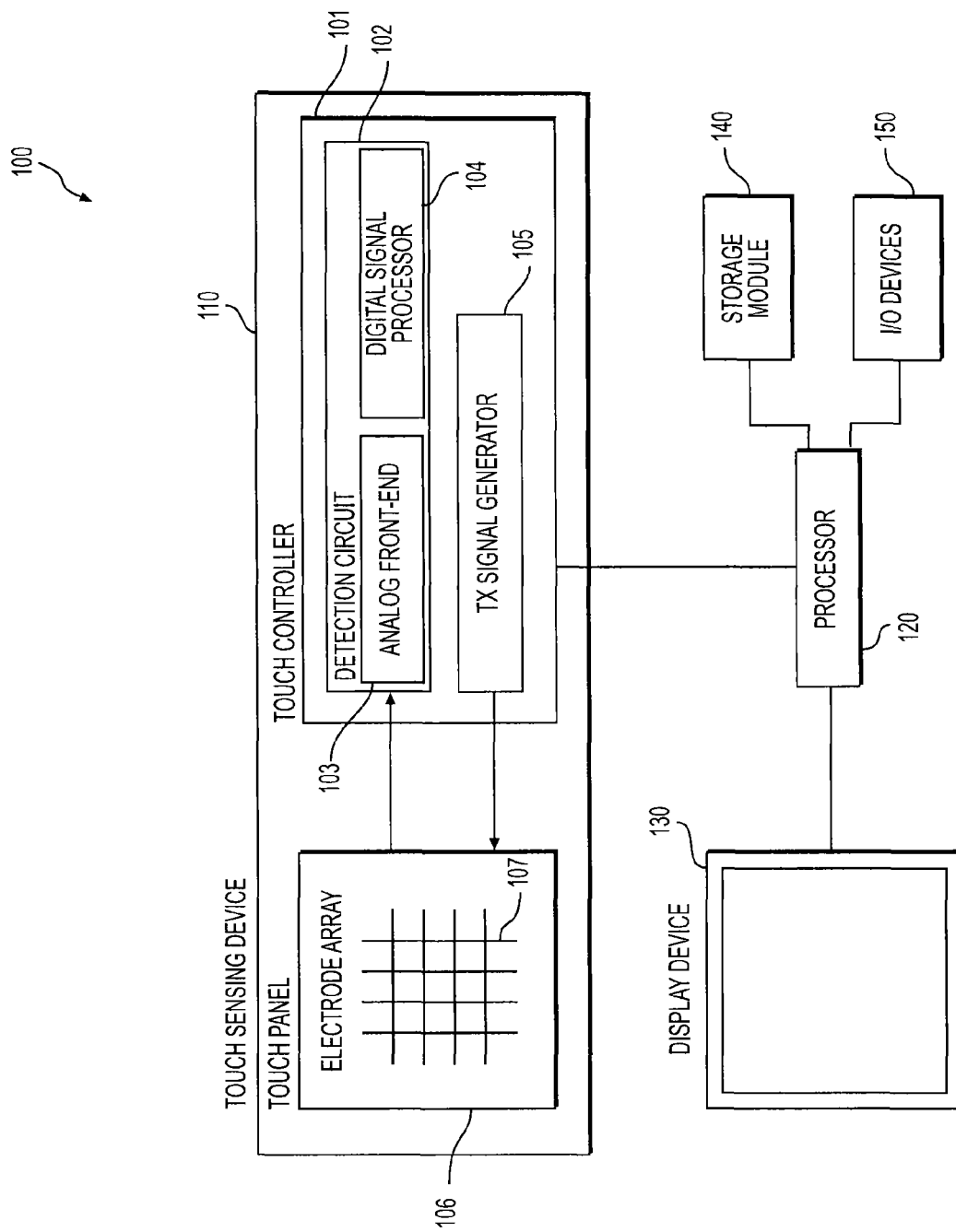
FIG. 1 shows a computer system including a touch sensing device according to an embodiment of the disclosure.

FIG. 1 shows a computer system 100 including a touch sensing device 110 according to an embodiment of the disclosure. In some embodiments, the computer system 100 may correspond to personal computer systems, such as mobile phones, desktop computers, laptops, tablets, and the like. In alternative embodiments, the computer system 100 may correspond to public computer systems, such as automated teller machines (ATM), vending machines, point of sale machines (POS), information kiosks, and the like. As shown, the computer system 100 includes a processor 120 that is coupled with the touch sensing device 110, a display device 130, a storage module 140, and input/output (I/O) devices 150.

The touch sensing device 110 is configured to detect touches of fingers or a conductive stylus and send detection information, such as positions of the touches at the touch sensing device 110, to the processor 120. The processor 120 interprets the touches in accordance with the program executed by the processor 120 and performs operations accordingly. In an embodiment, the touch device 110 includes a touch panel 106 and a touch controller 101.

The touch panel 106 can be based on resistance, capacitance, surface acoustic wave, and infrared light. In an embodiment, the touch panel 106 is based on capacitance, and includes an electrode array 107. In various embodiments, the electrodes in an electrode array can have various shapes and be arranged in various positions, thus forming various electrode patterns. In an embodiment, the electrode array 107 includes two layers of electrodes that are strip-shaped. One layer of electrodes is arranged in columns and the other layer of electrodes is arranged in rows. The row electrodes and column electrodes intersect with each other forming a matrix pattern. In another embodiment, the electrode array 107 includes two layers of electrodes and each electrode includes a plurality of sequentially connected electrode elements (or cells) that are diamond-shaped. Similarly to a matrix pattern, one layer of electrodes is arranged in columns and the other of electrodes is arranged in rows. The row electrodes and column electrodes are arranges over one another so as to form an interlocking diamond pattern.

According to an aspect of the disclosure, the electrode array 107 is arranged in a hollowed hexagon pattern that improves a touch sensing sensibility of the touch panel 106 in an embodiment.

The electrodes in the electrode array 107 can generally be made of any suitable conductive materials. In one embodiment, the touch panel 106 is a transparent capacitive touch panel positioned in front of a display device, such as the display device 130. In such type of application, the electrodes can be made of transparent conductive materials, such as indium tin oxide, thin metal film, carbon nanotube, and the like. In another embodiment, the touch panel 106 is a non-transparent capacitive touch panel used as a touch pad, such as a touch pad in a laptop. In such type of application, the electrodes can be made of non-transparent conductive materials, such as copper wires.

In operation, when a finger or conductive stylus approaches the touch panel 106, capacitance between different electrodes (mutual capacitance) or between electrodes and earth ground (self-capacitance) can be changed, and such capacitance variations can be measured by the touch controller 101. Consequently, a touch on the touch panel 106 can be detected.

The touch controller 101 is generally configured to continuously monitor capacitance variations at different locations of the electrode array to detect touches. Specifically, the touch controller generates a drive signal, called transmit (TX) signal, to impose a voltage on the electrodes included in the electrode array 107 in order to measure the capacitance at different driven electrodes, and receives a signal indicative of amount of capacitance at different driven electrodes. Based on the received signal, the touch controller 101 can detect capacitance variations at the electrode array and accordingly detect touches and locations of touches on the panel 106, and sends the detection information to the processor 120.

In an embodiment, the touch controller 101 includes a TX signal generator 105. The TX signal generator 105 is configured to generate a TX signal, such as a pulse wave, that is sequentially added to different electrodes.

In the embodiment, the touch controller 101 also includes a detection circuit 102. The touch controller 101 includes an analog front-end 103 and a digital signal processor (DSP) 104. The analog front-end 103 is configured to continuously receive from different electrodes (on which TX signal is imposed) a signal indicative of amounts of capacitance at different electrodes in the touch panel 106 and transform the signal into a signal suitable for subsequent DSP to process. In an embodiment, the TX signal generator 105 is configured to generate a pulse wave, and accordingly, the analog front-end can output another pulse wave that is modulated by the amounts of capacitance at different electrodes in the electrode array. When the capacitance changes, the modulated signal will change accordingly, thus indicative of a variation of the capacitance.

According to an aspect of the disclosure, the analog front-end 103 in an embodiment includes a hybrid sensing circuit operative in a first mode where the hybrid sensing circuit operates as a self-capacitance sensing circuit, and a second mode where the hybrid sensing circuit operates as a mutual capacitance sensing circuit. Two separate analog front-end circuits may be needed to measure mutual capacitance and self-capacitance respectively. Due to hybrid structure, the hybrid analog front-end 103 can reduce on-chip space utilization and decrease hardware cost.

The DSP 104 is configured to process the output signal of the analog front-end 103 and generates coordinate information of the touches performed on the touch panel 106. In addition, the DSP 104 may implement various software algorithms to fulfill touch detection functions or control functions. For example, the DSP 104 may perform algorithms for eliminating charger noises, detecting glove touches, distinguishing intentional touches (finger) from unintentional touches (palm), and the like.

In various embodiments, multiple touch controllers 101 can be used to monitor different areas of the touch panel 106 when a size of the touch panel 106 is so large that capacity of one touch controller 101 is not enough to monitor all capacitance variations of the touch panel 106.

In various embodiments, the touch controller 101 can be implemented into one or multiple integrated circuits (IC) or be implemented using separate components. In some embodiments, the touch controller 101 includes a memory module that stores software code and data used by the touch controller 101. In some embodiments, the touch controller 101 is connected to the touch panel 106 via a flexible print circuit (FPC) connector that includes a plurality of conductive wires.

The processor 120 can generally execute software code, such as operating system software, application software, and the like, to processing data and to control the operation of the computer system 100. The processor 120 can be a single-chip processor or can be implemented with multiple components. The storage module 130 can generally store software code and data used by the computer system 100. The storage module 130 can include read-only memory (ROM), random-access memory (RAM), hard disk drive, CD-ROM, flash memory, and the like. The I/O devices 150 can accept input data from or provide output data to outside of the computer system 100. The I/O devices can include keyboards, mouse, speaker, microphone, camera, network interface, and the like.

The display device 130 is configured to display a graphic user interface (GUI) to present output information of the computer system 100. In one embodiment, the display device 130 is a separate component, such as a monitor. In another embodiment, the display device 130 is integrated with other components in the computer system 100 to form stand-alone equipment, such as a tablet or a mobile phone. In various embodiments, the display device can be a liquid crystal display (LCD), a cathode ray tube (CRT), a plasma display, and the like.

Figure 2A:
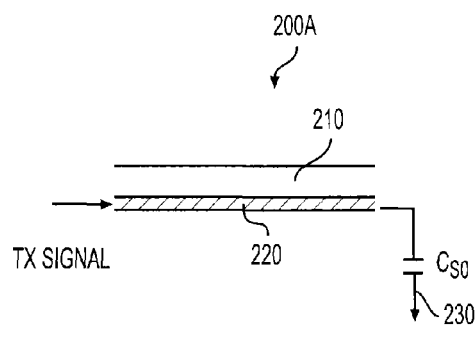
FIGS. 2A and 2B illustrate a self-capacitance sensing method where self-capacitance variations at an electrode in an touch panel are detected according to an embodiment of the disclosure.
Figure 2B:
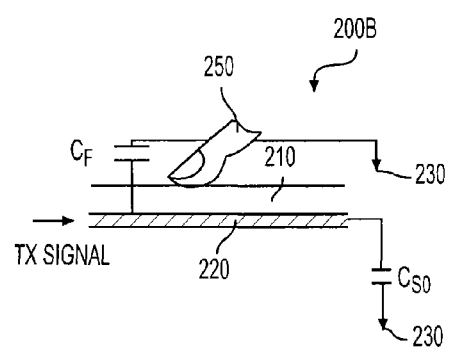

FIGS. 2A and 2B illustrate a self-capacitance sensing method where self-capacitance variations at an electrode in the touch panel 106 are detected according to an embodiment of the disclosure. In FIG. 2A, where a condition without a finger touch is shown, an electrode 220 is behind a cover lens 210 of the touch panel 106. A self-capacitance $C_S$ between the electrode 220 and the ground 230 equals to $C_{S0}$. To measure the self-capacitance $C_S$, a TX signal is added to the electrode 220. In FIG. 2B, when a finger 250 touches the cover lens, a capacitance $C_F$ is added between the electrode 220 and the ground 230 via a human body whose potential is approximately equal to ground potential. Now, the self-capacitance $C_S$ between the electrode 220 and the ground 230 increases from $C_{S0}$ to $C_{S0}+C_F$. This self-capacitance variation associated with the electrode 220 can be detected by the touch detection circuit 102, thus the finger touch is detected.

Figure 2C:
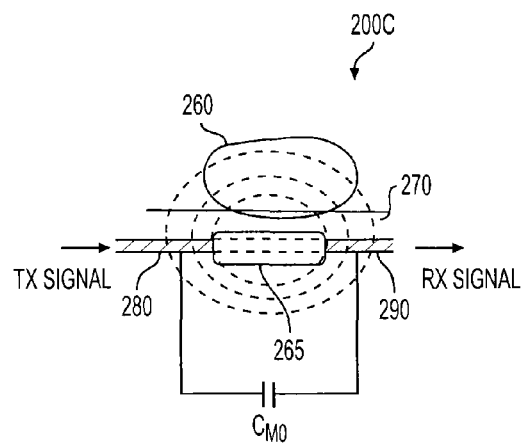
FIGS. 2C and 2D illustrate a mutual capacitance sensing method where mutual capacitance variations at two electrodes in a touch panel are detected according to an embodiment of the disclosure.
Figure 2D:
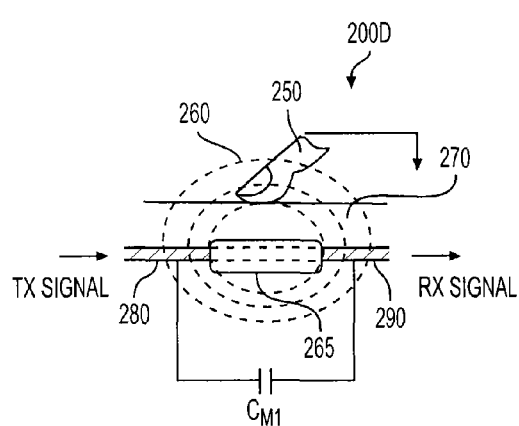

FIGS. 2C and 2D illustrate a mutual capacitance sensing method where mutual capacitance variations at two electrodes in the touch panel 106 are detected according to an embodiment of the disclosure. In FIG. 2C where a condition without a finger touch is shown, a drive electrode 280 and a receive electrode 290 are behind a cover lens 270. A mutual capacitance $C_M$ between the drive electrode 280 and the receive electrode 290 equals to $C_{M0}$. To measure the mutual capacitance $C_M$, a TX signal is added to the drive electrode 280 and a signal received (RX) from the receive electrode 290 is transmitted to the touch detection circuit 102. As shown, a plurality of electric field lines are distributed between the two electrodes 280 and 290. A first portion of the electric field lines 265, called near electric field lines, is close to the two electrodes 280 and 290, while a second portion of the electric field lines 260, called edge electric field lines, are projected and far from the two edge electrodes 280 and 290.

In FIG. 2D, when a finger 250 touches the cover lens 270, part of the edge electric field lines 260 are terminated at the finger 250 due to the potential difference between the drive electrode 280 and the finger 250. Thus, electric field lines between the two electrodes 280 and 290 are reduced leading to the reduction of the mutual capacitance $C_M$ from $C_{M0}$ to $C_{M1}$. This mutual capacitance variation at the vicinity of the drive electrode 280 and receive electrode 290 can be detected by the touch detection circuit 102, thus the finger touch is detected.

It is noted that during the above mutual capacitance variation detection process, when a finger touches the cover lens 270, the near electric field lines 265 are essentially unaffected, while the edge electric field lines 260 are substantially affected. Thus, the change of edge electric field lines 260 is the main factor that causes the variation of the mutual capacitance $C_M$.

In addition, touch sensitivity of a touch panel is positively correlated to a mutual capacitance variation ratio according to an aspect of the disclosure. A mutual capacitance variation ratio is defined as a ratio of mutual capacitance change over original mutual capacitance before the change takes place. Accordingly, in order to increase the mutual capacitance change ratio, strength of a near electric field can be decreased to decrease original mutual capacitance, and strength of an edge electric field can be increased to increase possible mutual capacitance change. Thus, touch sensitivity of the touch panel can be improved.

Further, a finger with thick glove does not affect the mutual capacitance $C_M$. Because the thick glove is nonconductive, a change of the edge electric field 340 caused by the glove is very small such that the change cannot be detected. In the other side, a finger with thick glove can still significantly causes a change in self-capacitance $C_S$ by adding a capacitance $C_F$ as shown in FIG. 2B. Consequently, a touch panel based on mutual capacitance sensing cannot detect a touch of a finger with a thick glove while a touch penal based on self-capacitance sensing can.

FIGS. 3A-D show four electrode arrays with different electrode patterns according to various embodiments of the disclosure. In FIG. 3, a conventional electrode array 300A includes a first layer 301 of evenly separated electrodes C1-C4 arranged in columns and a second layer 302 of evenly separated electrodes R1-R4 arranged in rows. Each electrode C1-C4 or R1-R4 includes a sequentially connected diamond-shaped electrode elements 310 that are connected via bridges 320. The row electrodes R1-R4 and column electrodes C1-C4 are arranged over one another so as to form an interlocking pattern. In various embodiments, the first layer 301 and the second layer 302 may be coplanar, and at each intersection 330 insulators are filled between bridges of column electrodes and row electrodes so that the column electrodes and the row electrodes are insulated. In alternative embodiments, the first layer 301 and the second layer 302 may be placed in two different planes and a thin layer of dielectric is sandwiched between the two layers 301 and 302. As the electrode array 300A includes diamond-shaped electrode elements, the arrangement of the electrode elements in the electrode array 300A described above is referred to as a diamond pattern.

Figures 3A, 3B:
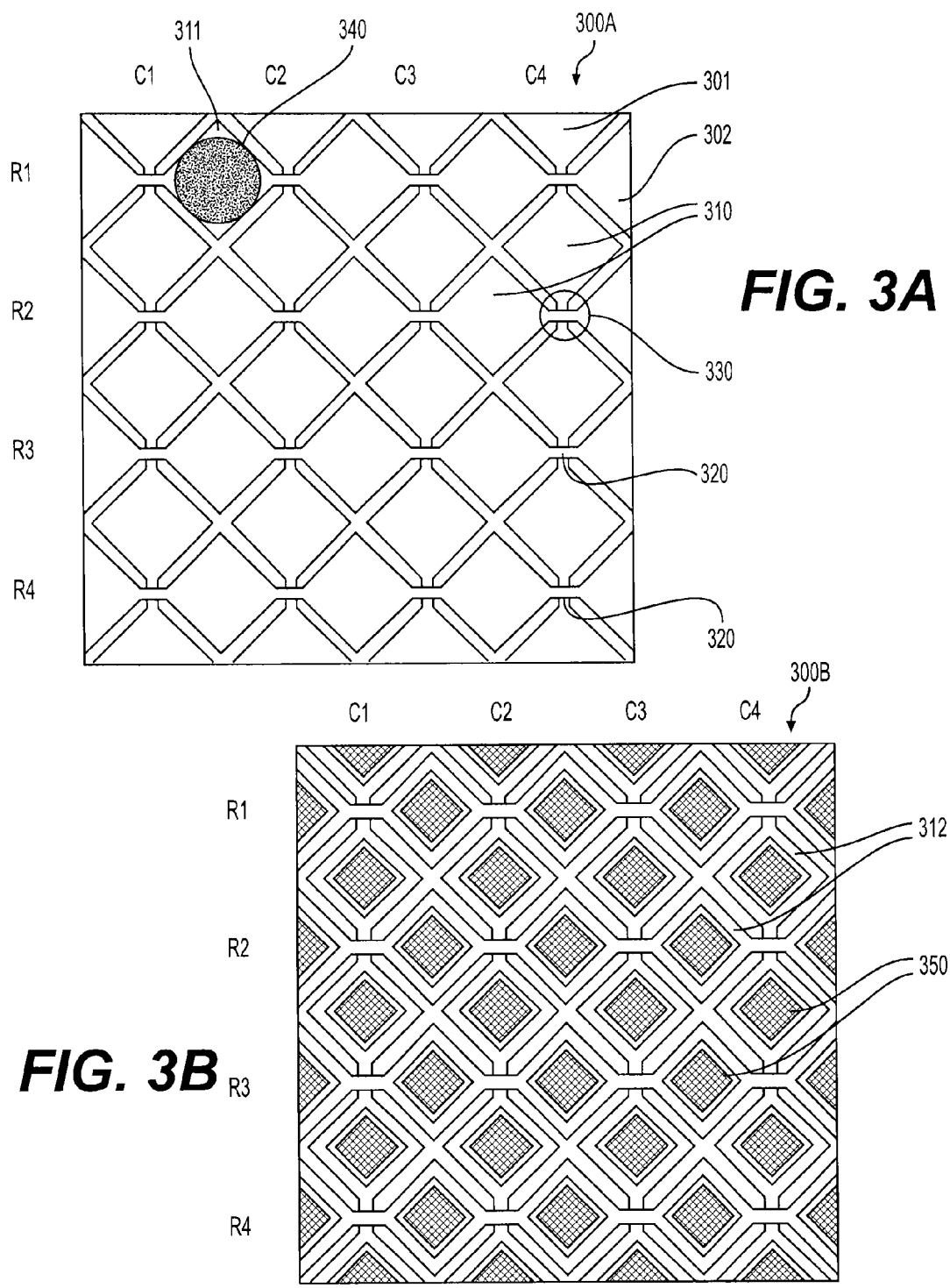
FIGS. 3A-D show four electrode arrays with different electrode patterns according to various embodiments of the disclosure.

An advantage of the above described diamond pattern is that self-capacitance changes caused by a finger touch is easy to be detected, because each diamond-shaped electrode element 310 has a large area that is helpful for forming a large self-capacitance between the electrode and the finger. However, the large area of electrode elements can cause difficulty to detect a finger touch when using mutual capacitance detection method. For example, as shown in FIG. 3A, a finger touch takes place at the center of the electrode element 311 and the touch point 340 is smaller than the area of the electrode element 311. Because edge electric field close to the center of the electrode element 311 is so weak that changes of this part of edge electric field have little effect on the mutual capacitance. Therefore, mutual capacitance change ratio (defined as mutual capacitance change over original mutual capacitance) caused by the touch cannot be detected. Further, large self-capacitance caused by large electrode element area may disturb detection of mutual capacitance between two electrodes. For example, when two finger touches happened at the same time at two electrodes, self-capacitance at the two electrodes may be connected in series between the two electrodes when human body is disconnected from earth ground, thus interfering with the mutual capacitance between the two electrodes.

FIG. 3B illustrates a conventional electrode array 300B having a hollowed diamond pattern. The structure and conductive materials of the electrode array 300B is similar to that of the electrode array 300A shown in FIG. 3A except that the electrode elements 312 are hollowed-diamond-shaped, and the hollowed areas at the electrode elements 312 are filled with suspended blocks 350. The suspended blocks 350 are made of conductive materials that can be the same as or different from conductive materials of the electrodes. In an embodiment, the electrode array 300B are made of transparent materials, such as ITO, and the suspend bocks are also made of the same transparent materials so that the light transmittance is uniform all over the electrode array 300B. In an alternative embodiment, the suspended blocks 350 are all placed in the top layer of the electrode array.

In the above described hollowed diamond pattern, the suspended blocks 350 can help to shunt edge electric field emitted from a drive electrode to a receive electrode, thus strengthening edge electric field. When a finger touch takes place, changes of the edge electric field will be larger than that happened in the diamond pattern in FIG. 3A, leading to a higher mutual capacitance change ratio. Higher mutual capacitance change ratio improves mutual capacitance sensibility of the electrode array 300B. However, hollowed diamond pattern causes electrode parasitic resistance, which defined as resistance of an electrode such as electrode C1 or R1, to increase. Increased parasitic resistance can increase decrease currents passing through electrodes, thus increase charging time of capacitors in a detection circuit, such as the detection circuit 102 in FIG. 1, thus decrease speed of detection operation. For a large touch panel, small electrode parasitic resistance is preferred.

Figure 3C:
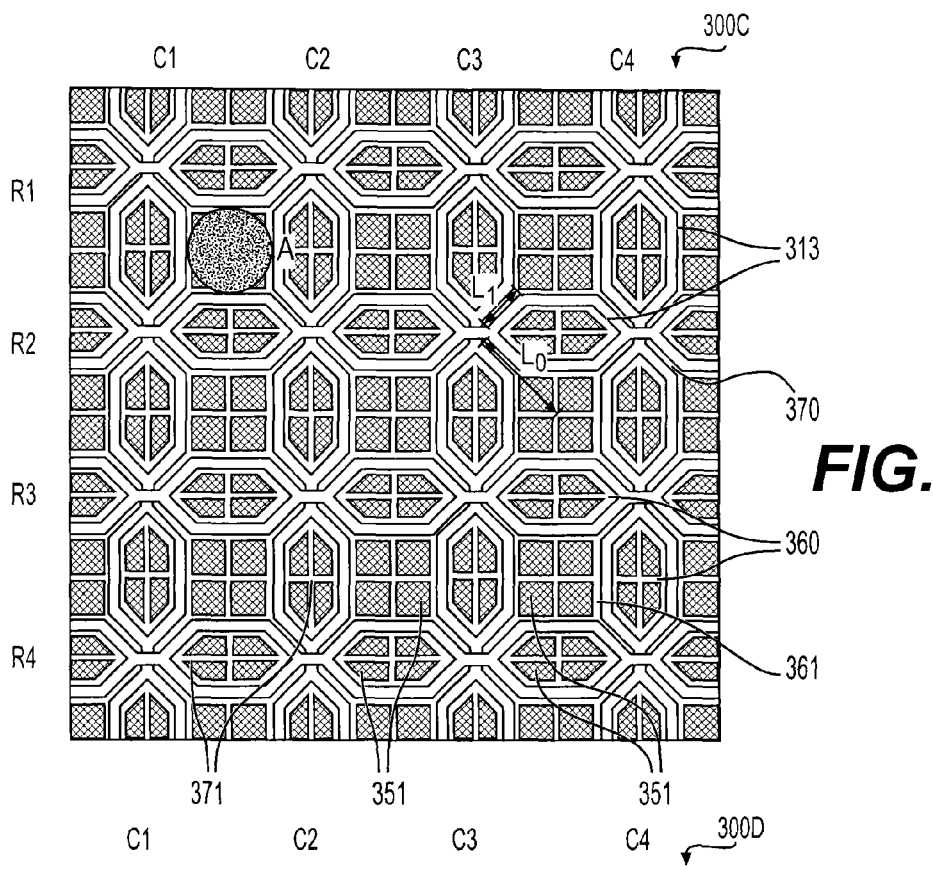

FIG. 3C illustrates an electrode array 300C having a hollowed hexagon pattern. The structure and conductive materials in electrodes and suspended blocks of the electrode array 300C is similar to that of the electrode array 300B shown in FIG. 3B. However, the electrode elements 313 are now in the shape of hollowed hexagon not hollowed diamond, and the hollowed areas 360 inside the electrode elements 313 and hollowed areas 361 between the electrode elements 313 are filled with suspended blocks that include multiple separated suspended blocks 351. In alternative embodiments, suspended blocks inside the hollowed areas 360 and 361 are of a whole piece of suspended blocks. In further alternative embodiments, the electrode elements 313 can be generally shaped as elongated polygons, either with or without areas inside of the electrodes being hollowed.

According to an aspect of the disclosure, mutual capacitance change ratio in a hollowed hexagon pattern shown in FIG. 3C is larger than that in a hollowed diamond pattern shown in FIG. 3B. As shown in FIG. 3C, the length $L_1$ of gaps between neighboring hexagons is reduced compared with the length $L_0$ that equals to the length of gaps between two neighboring hollowed diamonds in FIG. 3B. In one embodiment, the length $L_1$ is half or less than half of the length $L_0$. The mutual capacitance between a row electrode and a column electrode is mainly decided by near electric field in the vicinity of the gaps between edges of electrode elements. Thus, as the length of the gaps is reduced, the mutual capacitance between adjacent electrodes is reduced. Additionally, according to an aspect of the disclosure, when a finger touch takes place, average amount of mutual capacitance changes associated with the hollowed hexagon pattern in FIG. 3C is similar to that associated with the hollowed diamond pattern in FIG. 3B. Consequently, mutual capacitance change ratio in a hollowed hexagon pattern is increased compared with a hollowed diamond pattern.

In an embodiment, the hollowed areas 360 inside the electrode elements 313 and hollowed areas 361 between the electrode elements 313 are filled with suspended blocks that include multiple separated suspended blocks 351. It is know that the more gaps between the separated suspended blocks 351, the more edge electric field lines are projected from the gaps. Accordingly, the gaps 371 between the multiple separated suspended blocks 351 strengthen the edge electric field at the hollowed areas 360 and 361, thus increasing uniformity of the edge electric field distribution at the electrode array 300C and improving sensitivity of the electrode array 300C.

In addition, resistance of each electrode in the hollowed hexagon pattern shown in FIG. 3C is reduced due to shorter side length of the hexagon electrode elements in FIG. 3C compared with the diamond electrode elements in FIG. 3B. Furthermore, self-capacitance change ratio, defined as added self-capacitance $C_F$ when a touch takes place over original self-capacitance $C_{S0}$, as shown in FIG. 2B, can be the same between the two patterns in FIGS. 2C and 2B, because the self-capacitance changes are mainly decided by the size of the electrodes in an electrode array, and the electrode sizes are similar in the two patterns shown in FIGS. 3B and 3C.

In an embodiment, a size of the hexagon electrode elements 313 in FIG. 3C is kept above a certain level. When the size of the hexagon electrode elements 313 in FIG. 3C is too small, edge electric field at the hollowed area 361 between neighboring electrode elements becomes weak, thus mutual capacitance change ratio caused by a touch at point A will be small. Accordingly, uniformity of the edge electric field cannot maintain.

Figure 3D:
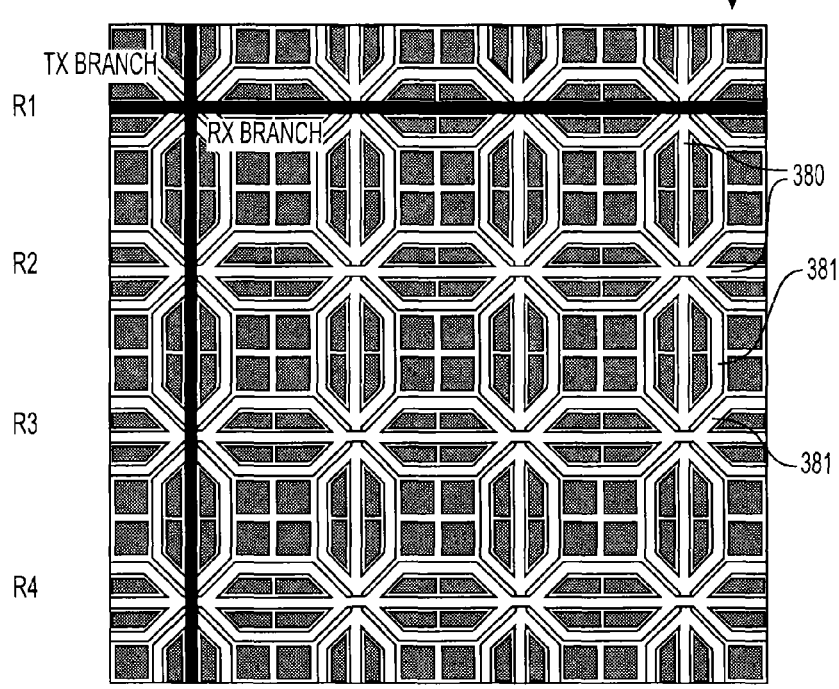

FIG. 3D illustrates an electrode array 300D where each electrode has an extra branch 380 at the middle of each electrode according to an embodiment of the disclosure. The electrode array 300D are the same as the electrode 300C shown in FIG. 3C, however, an extra branch 380 that is strip-shaped is included at the middle of each electrode and goes through all electrode elements in each electrode in order to reduce parasitic resistance of each electrode.

Typically, the extra branches 380 are made of conductive materials the same as other parts of each electrode. In alternative embodiments, the extra branches 380 can be made of conductive materials that are different from other parts of each electrode. In various embodiments, a width of the extra branches 380 can be the same as or different from a width of side traces 381 of the electrode elements, and the width of the extra branches 380 has no significant effect on the mutual capacitance change ratio.

Figure 4:
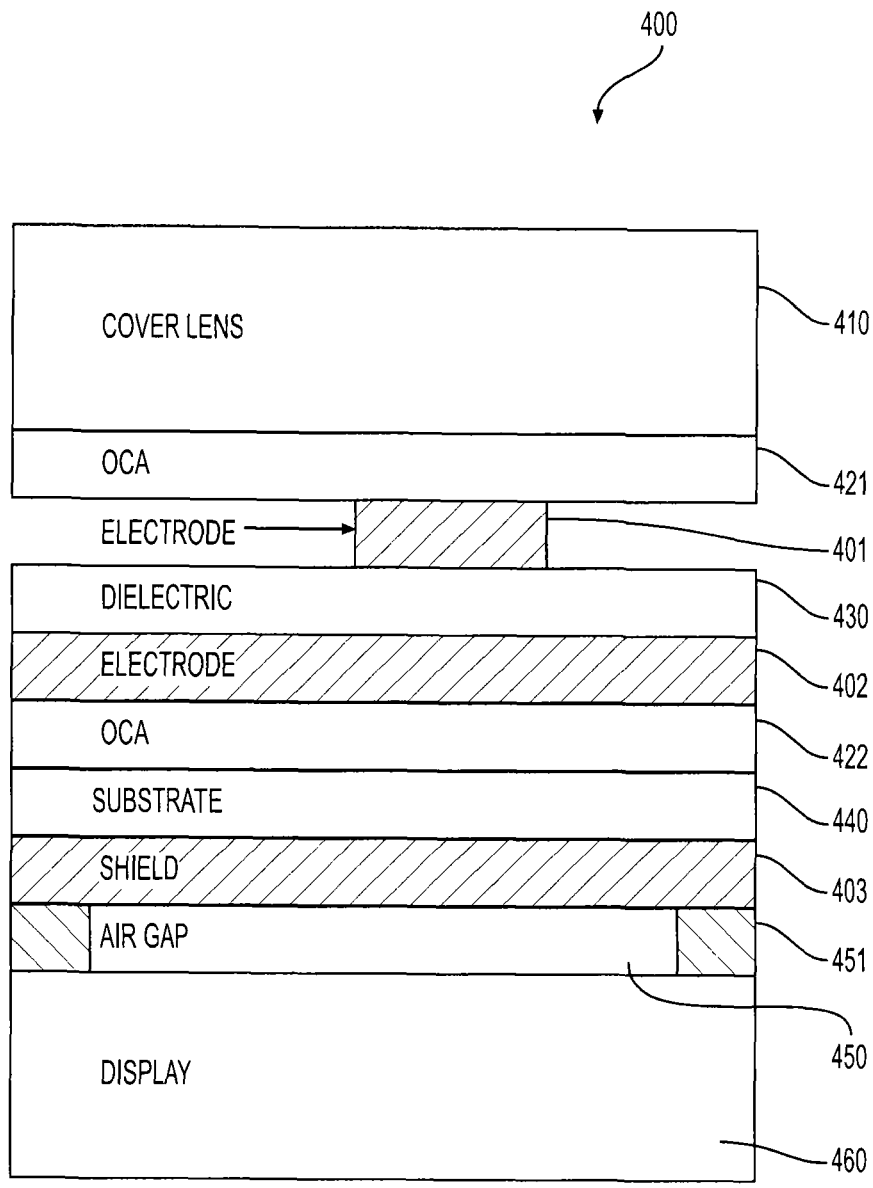
FIG. 4 illustrates an exemplary layer structure of a touch panel in a cross-sectional view according to an embodiment of a disclosure.

FIG. 4 illustrates an exemplary layer structure of a touch panel 400 in a cross-sectional view according to an embodiment of a disclosure. As shown, the touch panel 400 includes an electrode array having a first electrode 401 in a first layer and a second electrode 402 in a second layer. The two electrodes 401 and 402 are insulated by a layer of dielectric, such as polyester (PET). The electrode array is covered with a cover lens 410, and a layer of optically clear adhesive (OCA) 421 is used to bond the electrode array and the cover lens 410 together. The cover lens can be made of glass or plastic. Below the electrode array is a substrate layer 440 that is bonded to the electrode array by a layer of OCA 422. The substrate layer 440 can be made of glass or PET and provides a basis for a shield layer 403 that shields interference signals from a display 460. The shield layer 403 is generally made of transparent conductive materials, such as ITO. An air gap 451 is constructed between the shield layer 403 and the display 460 with gaskets 451 providing support. The air gap 451 can reduce noise interference from the display 460 to the electrode array. The display can be a liquid crystal display (LCD), a light-emitting diode (LED) display or other type of display.

In different embodiments, the layer structures can be various. For example, in an embodiment, to make the touch panel 400 thinner, the first layer electrode and the second layer electrode in FIG. 4 can be coplanar where insulators are used at intersections between the two layers. In an alternative embodiment, noise signals from the display 460 may be ignorable thus that the shield layer 403 and the substrate layer 440 can be removed. In a further embodiment, the electrode array is integrated into structure of the display 460 to make the touch panel thinner. For example, the electrode array can be arranged between a top polarizer layer and a color filter glass layer of a display module, such as the display 460, forming an "on cell" stack-up structure. In another example, a layer of the electrode array can be arranged below a color filter glass layer of a display module, forming an "in cell" stack-up structure.

Figure 5A:
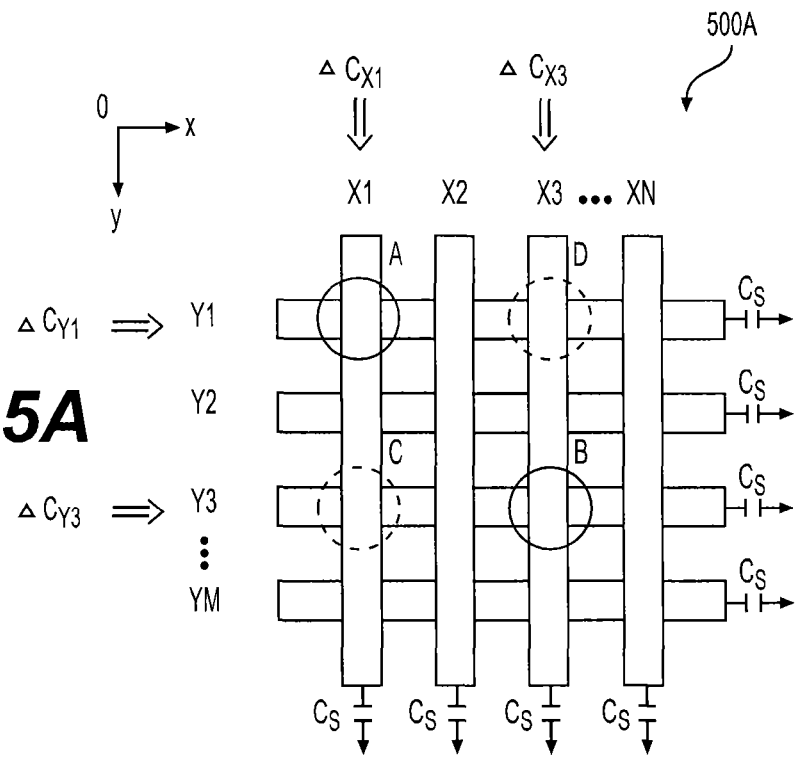
FIGS. 5A and 5B illustrate two electrode arrays according to an embodiment of the disclosure.

FIG. 5A illustrates an electrode array 500A according to an embodiment of the disclosure. A scan process to determine touch location based on self-capacitance measurement is shown. In FIG. 5A, the electrode array 500A includes a first layer of electrodes X1-XN arranged in columns and a second layer of electrodes Y1-YM arranged in rows. The row electrodes and column electrodes intersect with each other forming a matrix pattern. Each intersection of a row electrode and a column electrode can be mapped to a point in a Cartesian coordinate system and correspond to a unique coordinate pair, such as an x coordinate and a y coordinate.

In an embodiment, in order to detect a finger touch, a touch controller, such as the touch controller 101, continuously scans the electrodes in the electrode array 500 one by one, and measures an amount of self-capacitance $C_S$ of each electrode. When a finger touch takes place at a touch point A as shown in FIG. 5A, the self-capacitance of the electrodes X1 and Y1 will change. For example, the self-capacitance of the electrodes X1 and Y1 increase by $\Delta C_{Y1}$ and $\Delta C_{X1}$, respectively. The touch controller detects the changes and accordingly determines the two electrodes X1 and Y1 associated with the changes. Thus, the intersection of the two electrodes X1 and Y1 and corresponding coordinate pair can be determined.

The above described self-capacitance detection method generally is not capable to detect multiple touches that take place simultaneously. For example, in FIG. 5A, two finger touches take place simultaneously at touch point A and B. The touch controller detects self-capacitance changes at electrodes Y1, Y3, X1 and X3, and accordingly obtains four intersections at touch point A, B, C and D, among which touch points C and D, called "ghost points", are false.

Figure 5B:
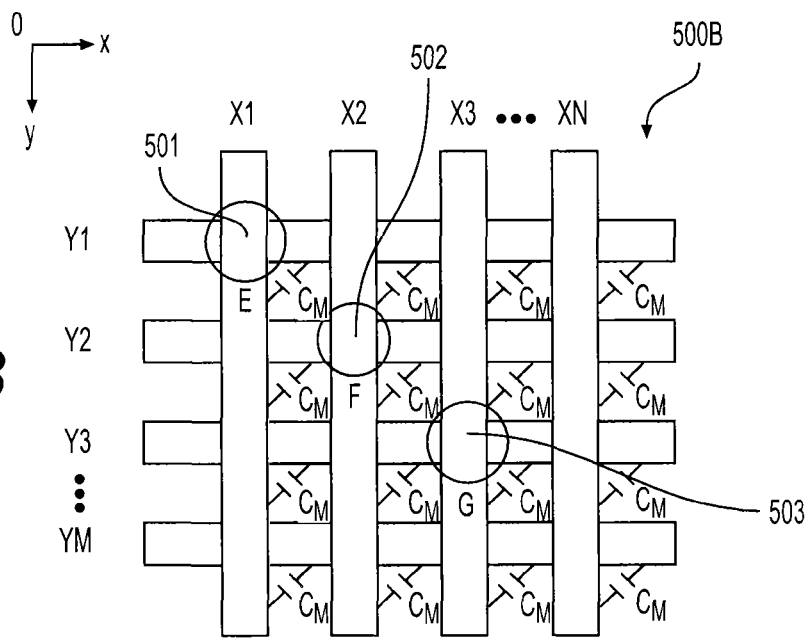

FIG. 5B illustrates an electrode array 500B according to an embodiment of the disclosure. The electrode array 500B is the same as the electrode array 500A shown in FIG. 5A, however, a scan process to determine touch location based on mutual-capacitance measurement is shown in FIG. 5B.

In an embodiment, in order to detect a finger touch, a touch controller, such as the touch controller 101 continuously scans the electrodes in the electrode array 500 to measure an amount of mutual-capacitance Cm between row electrodes and column electrodes. Different from the scan process in FIG. 5A where self-capacitance of each electrode is measured, mutual capacitance at each intersection between two electrodes is measured in FIG. 5B. When multiple finger touches take place at a touch point E, F and G as shown in FIG. 5B, mutual-capacitance change at intersections 501, 502 and 503 can be detected. Thus, coordinates of intersections 501, 502 and 503 can be determined unambiguously.

In the above FIGS. 5A and 5B examples, the mutual capacitance scan process consumes more scanning time than the self-capacitance scan process. For example, number of the self-capacitance $C_S$ measured in the FIG. 5A example is M+N, while number of mutual capacitance Cm measured in the FIG. 5B example is M×N.

Figure 6A:
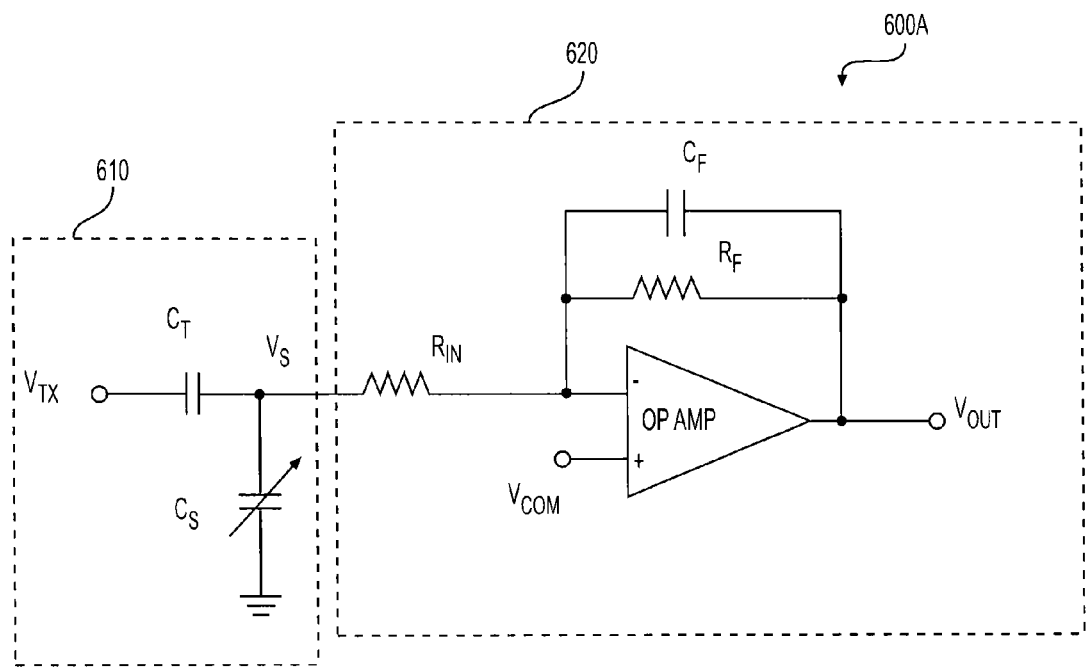
FIGS. 6A and 6B show two exemplary sensing circuits according to an embodiment of the disclosure.
Figure 6B:
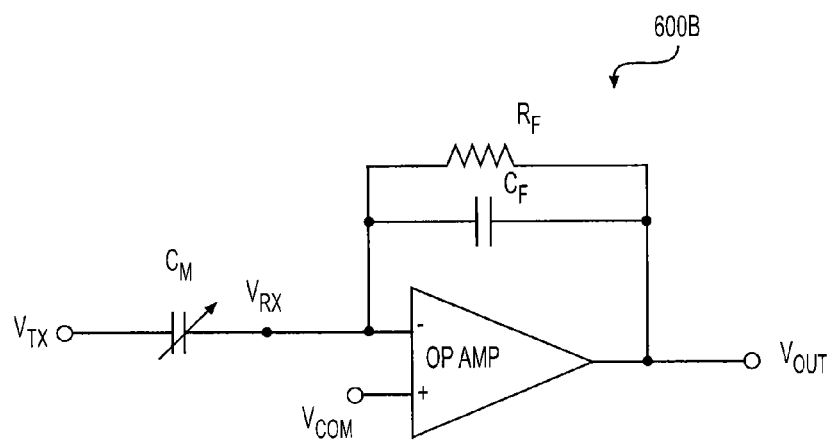

FIGS. 6A and 6B show two exemplary sensing circuits according to an embodiment of the disclosure. Both circuits sense self-capacitance variations or mutual capacitance variations, respectively, and output a signal indicative of the capacitance variations.

FIG. 6A shows an exemplary self-capacitance sensing circuit 600A including an input circuit 610 and an amplifier circuit 620. In the input circuit 610, a drive signal $V_{TX}$, such as a pulse wave signal, from a touch controller, such as the touch controller 101, is added at a terminal of a capacitor $C_T$. The capacitor $C_T$ is preconfigured to have a certain capacitance value and is coupled with a capacitor $C_S$ represents a self-capacitance of an electrode in an electrode array which changes when a touch takes place at the electrode. In addition, a resistor $R_{IN}$ couples the input circuit 610 to the amplifier circuit 620. The resistor $R_{IN}$ is configured to have a large resistance value thus that a current passing the resistor $R_{IN}$ can be ignored. As a result, the two capacitors $C_T$ and $C_S$ form a voltage divider while being charged by the drive signal $V_{TX}$. Accordingly, an peak voltage $V_S'$ of an output signal $V_S$ of the input circuit can be determined as follows, $$V_S' = \frac{C_T}{C_T + C_S} V_{TX},$$

where $V_{TX}'$ represents peak voltage of the pulse wave drive signal $V_{TX}$, and $C_T$ and $C_S$ represent capacitance corresponding to respective capacitors. Thus, the output signal $V_S$ is a delayed pulse wave with the peak voltage $V_S'$ being modulated by the self-capacitance changes.

In the amplifier circuit 620, a feedback capacitor $C_F$ and a feedback resistor $R_F$ are paralleled together and are connected between an inverting input terminal and an output terminal of an operational amplifier (op amp). The resistor $R_{IN}$ is connected to the inverting input terminal and the non-inverting input terminal of the op amp is biased at a voltage $V_{COM}$. When the peak voltage $V_S'$ of the output signal $V_S$ of the input circuit 610 is added to a terminal of resistor $R_{IN}$, the feedback capacitor $C_F$ is charged and a voltage drop on the capacitor $C_F$ (also on the resistance $R_F$) is increased until a current coming from the resistor $R_{IN}$ all passes through the feedback resistor $R_F$. As a result, the resistor $R_{IN}$ and the feedback resistor $R_F$ becomes a voltage divider. Accordingly, a peak voltage $V_{OUT}'$ of an output signal $V_{OUT}$ at the output terminal of the op amp can be determined as follows, $$V_{OUT}' = -\frac{R_F}{R_{IN}} V_S'.$$

Thus, the output signal $V_{OUT}$ is a delayed pulse wave with the peak voltage $V_S'$ is amplified by a gain of $-R_F/R_{IN}$.

It is apparent that in the FIG. 6A example, changes in self-capacitance $C_S$ leads to changes in the output signal $V_{OUT}$ of the self-capacitance sensing circuit 600A, resulting in an effect of "modulation" where input signal $V_{TX}$ is modulated by the self-capacitance changes forming the output signal $V_{OUT}$.

FIG. 6B shows an exemplary mutual capacitance sensing circuit 600B. As shown, a drive signal $V_{TX}$, such as a pulse wave signal, from a touch controller, such as the touch controller 101, is added to a terminal of a capacitor $C_M$ that represents mutual capacitance between two electrodes in a touch panel. A receive signal $V_{RX}$ is received at another terminal of the capacitor $C_M$ and added to a converting input terminal of an op amp. A feedback capacitor $C_F$ and a feedback resistor $R_F$ are paralleled together and are connected between an inverting input terminal and an output terminal of an op amp. In addition, a non-converting input terminal of the op amp is biased at a voltage $V_{COM}$. When the pulse wave drive signal $V_{TX}$ increases from maximum voltage to its peak voltage, the capacitor $C_M$ and the feedback capacitor $C_F$ are charged. Because the feedback resistor $R_F$ is configured to have a large value and current passing through $R_F$ can be ignored, thus, the capacitor $C_M$ and the feedback capacitor $C_F$ form a voltage divider. Accordingly, a peak voltage $V_{OUT}'$ of an output signal $V_{OUT}$ at the output terminal of the op amp can be determined as follows, $$V_{OUT}' = -\frac{C_M}{C_F} V_{TX}',$$

where $V_{TX}'$ represents peak voltage of the pulse wave drive signal $V_{TX}$, and $C_M$ and $C_F$ represent capacitance corresponding to respective capacitors. Thus, the output signal $V_{OUT}$ is a delayed pulse wave with the peak voltage $V_{TX}'$ of the input signal $V_{TX}$ amplified by a gain of $-C_M/C_F$.

It is also apparent that in the FIG. 6B example, changes in mutual-capacitance $C_M$ leads to changes in the output signal $V_{OUT}$ of the self-capacitance sensing circuit 600A, resulting in an effect of "modulation" where input signal $V_{TX}$ is modulated by the self-capacitance changes forming the output signal $V_{OUT}$.

As described above, a touch panel adopting self-capacitance sensing method can consume shorter scan time (leading to less power consumption) and be capable to sense thick glove finger touch, but cannot support sensing simultaneous multiple touches, while a touch panel adopting mutual-capacitance sensing method can consume longer time (leading to more power consumption) and be capable to sense simultaneous multiple touches, but cannot support thick glove touch. Therefore, it is desirable that a touch panel as well as a touch controller is capable to support self-capacitance sensing and mutual capacitance sensing at the same time.

Figure 7A:
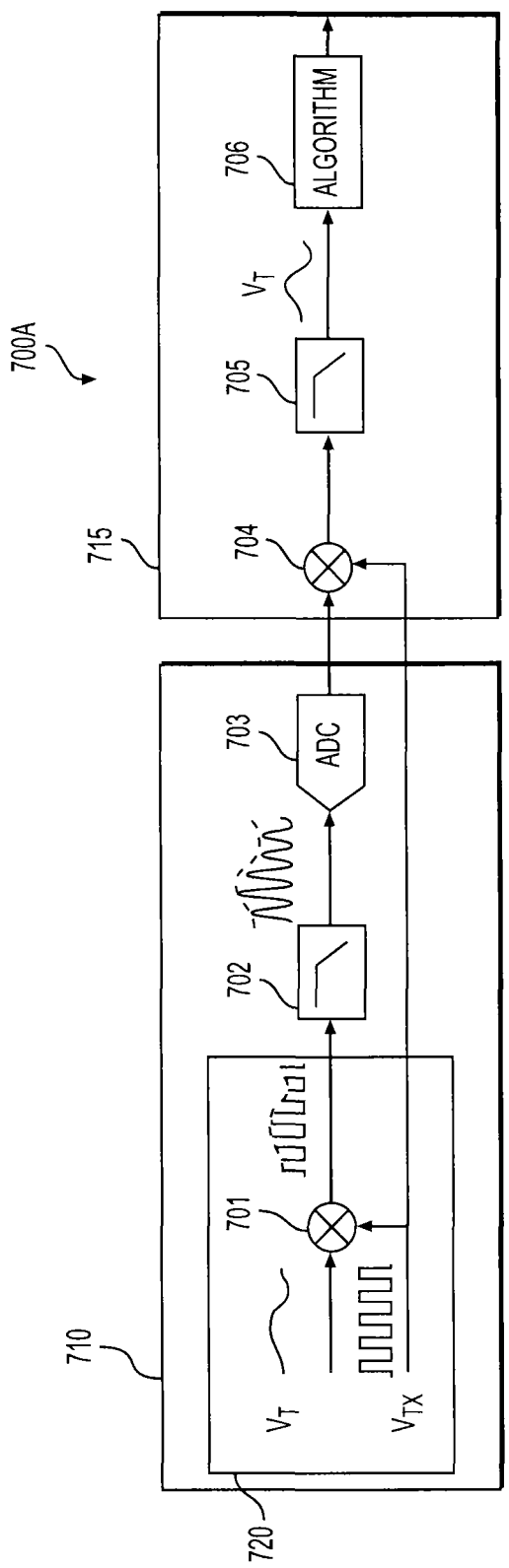
FIG. 7A shows an exemplary detection circuit that includes a hybrid sensing circuit 720 according to an embodiment of the disclosure.

FIG. 7A shows an exemplary detection circuit 700A that includes a hybrid sensing circuit 720 capable of both self-capacitance sensing and mutual capacitance sensing according to an embodiment of the disclosure.

The detection circuit 700A is similar to the detection circuit 102 in FIG. 1 but shown with more details. As shown, in an embodiment, the detection circuit 700A includes an analog front-end 710 and a digital signal processor (DSP) 715. The analog front-end 710 transforms a touch signal $V_T$ indicative of a self-capacitance or mutual capacitance variations to a digital signal that is fed into the DSP 715. Based on the received digital signal from the analog front-end, the DSP 715 determines coordinates of the finger touch point on a touch panel, and supply data of the coordinates to a computer system, such as the computer system 100.

In an embodiment, the analog front-end 710 includes the hybrid sensing circuit 720, a low pass filter 702 and an analog-to-digital converter (ADC) 703; the DSP 715 includes a digital demodulator 704, a low pass digital filter 705 and an algorithm module 706. In operation, signals indicative of capacitance variations passes through the above components 720 and 702 to 706. Specifically, the hybrid circuit 720 performs a function of a modulator 701 where a pulse wave drive signal $V_{TX}$ is modulated by a touch signal $V_T$ that indicates capacitance variations, and a modulated pulse wave signal is produced. Next, the modulated pulse wave signal is passed through the low pass filter 702 to remove high frequency noises. Then, the filtered signal is converted to digital signal by the ADC 703 and fed to the DSP 715. At the digital demodulator 704, the digitalized signal is demodulated and passed to the low pass digital filter 705. The low pass digital filter 705 then restores the touch signal $V_T$ and feeds it to the algorithm module 706 where the touch signal $V_T$ is processed and coordinates corresponding to finger touches are determined using related algorithms.

Figure 7B:
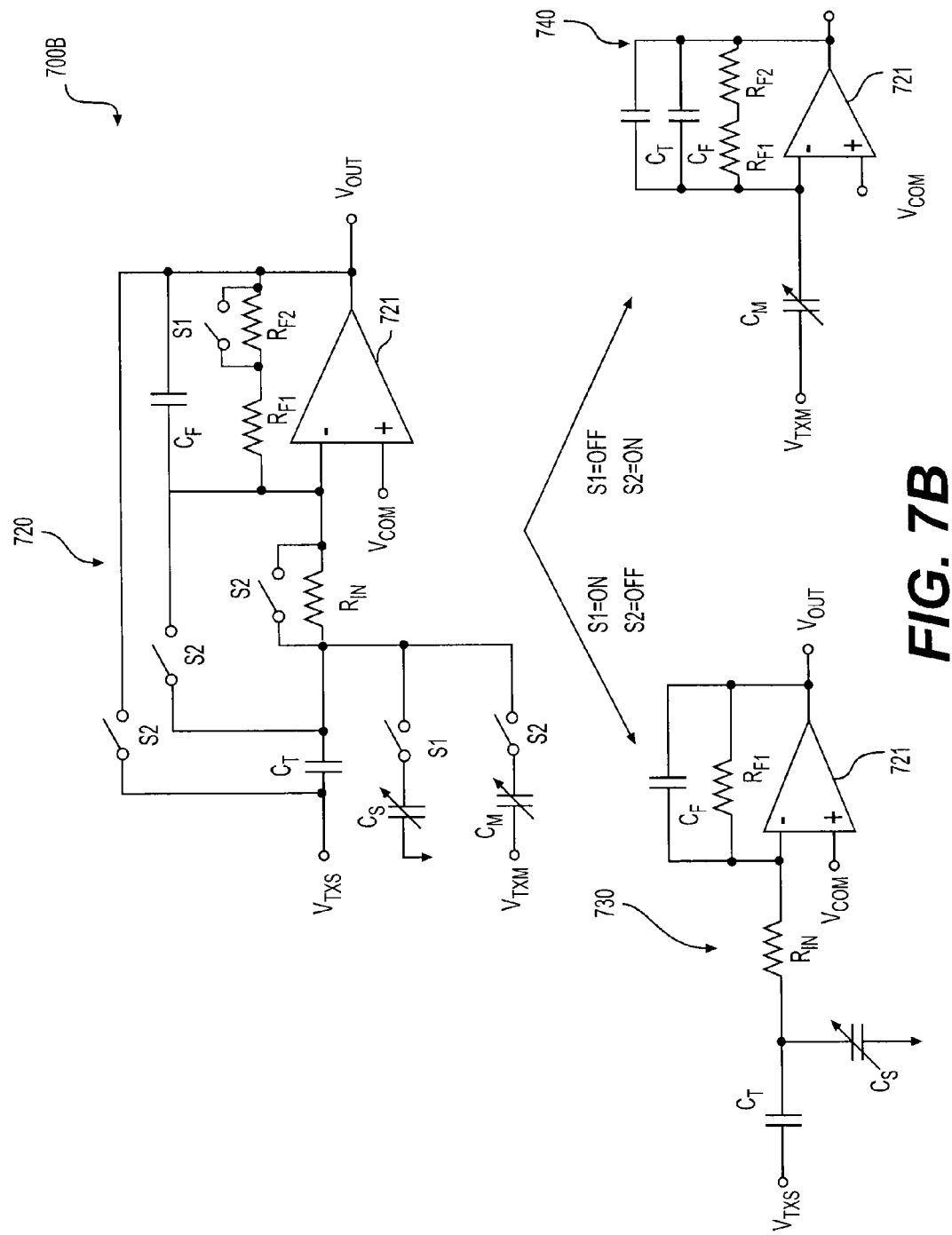
FIG. 7B shows an exemplary hybrid sensing circuit and two transformed circuits of a hybrid sensing circuit according to an embodiment of the disclosure.

FIG. 7B shows an exemplary hybrid sensing circuit 720 and two transformed circuits 730 and 740 of the hybrid sensing circuit 720 according to an embodiment of the disclosure. In an embodiment, the hybrid sensing circuit 720 can be operated in a first mode where the hybrid sensing circuit 720 operates as a self-capacitance sensing circuit and in a second mode where the hybrid sensing circuit 720 operates as a mutual capacitance sensing circuit. In addition, the hybrid sensing circuit 720 has a set of switches that are configured to change an operation of the hybrid sensing circuit between the first mode and the second mode.

In the FIG. 7B example, the hybrid sensing circuit 720 includes a first set of switches S1, labeled with S1 in FIG. 7B, and a second set of switches S2, labeled with S2 in FIG. 7B. When the first set of switches S1 and the second set of switches S2 change their on/off status, the hybrid sensing circuit 720 can switch between the first mode of operation and the second mode of operation. Specifically, when the first set of switches S1 is on and the second set of switches S2 is off (this condition is noted as S1=ON, S2=OFF in FIG. 7B), the hybrid sensing circuit 720 is transformed into the first mode where the hybrid sensing circuit 720 operates as the self-capacitance sensing circuit 730. Similarly, when the first set of switches S1 is off and the second set of switches S2 is on (this condition is noted as S1=OFF, S2=ON in FIG. 7B), the hybrid sensing circuit 720 is transformed into the second mode where the hybrid sensing circuit 720 operates as the mutual capacitance sensing circuit 730. Thus, the hybrid sensing circuit 720 can be used to sense self-capacitance change as well as mutual capacitance changes by change an on/off status of the two sets of switches S1 and S2.

As shown in FIG. 7B, in the hybrid sensing circuit 720, a drive signal $V_{TXS}$ for self-capacitance detection is added to a terminal of a capacitor $C_T$ that is serially connected with a resistor $R_{IN}$. The resistor $R_{IN}$ is connected with an inverting terminal of an op amp 721. The op amp 721 has a feedback capacitor $C_F$ and two feedback resistors $R_{F1}$ and $R_{F2}$ that are serially connected. The feedback capacitor $C_F$ and two feedback resistors $R_{F1}$ and $R_{F2}$ are placed between the converting input terminal and the output terminal of the op amp 721. In addition, an non-inverting input terminal of the op amp 721 is biased with a voltage $V_{COM}$ and an output signal $V_{OUT}$ of the hybrid sensing circuit 720 is transmitted from the output terminal of the op amp 721. Further, a first S1 switch (switch belongs to the first set of switches S1) is connected with $R_{F2}$ in parallel, and a first and a second S2 switches are connected with $R_{IN}$ in parallel. A third S2 switch is connected between the terminal of the capacitor $C_T$ and the output terminal of the op amp 721. Further, a second S1 switch connects a self-capacitance capacitor $C_S$ into the hybrid sensing circuit 720 between the capacitor $C_T$ and the resistance $R_{IN}$, and one terminal of the self-capacitance capacitor $C_S$ is grounded. Similarly, a fourth S2 switch connects a mutual capacitance capacitor $C_M$ into the hybrid sensing circuit 720 between the capacitor $C_T$ and the resistance $R_{IN}$. A drive signal $V_{TXM}$ for mutual capacitance detection is added to the mutual capacitance capacitor $C_M$.

The self-capacitance sensing circuit 730 and the mutual capacitance sensing circuit 740 are the same as the self-capacitance sensing circuit 600A in FIG. 6A and the mutual capacitance sensing circuit 600B in FIG. 6B, respectively. Therefore, the description of the two sensing circuit 730 and 740 is omitted for brevity.

In various embodiments, the hybrid sensing circuit 720 together with other components including the analog front-end 710 and the DPS 715 in the detection circuit 700A can be implemented into one integrated circuit (ICs), or multiple separated ICs. The two set of switches S1 and S2 can be implemented using transistors, such as bipolar transistors or metal-oxide-semiconductor field-effect (MOSFET) transistors, or other suitable technologies.

What is claimed is:

1. A touch panel having an electrode array, the electrode array comprising:
   first electrodes arranged on a first layer, each first electrode patterned to include a plurality of sequentially connected first electrode elements that are generally shaped as elongated polygons, each elongated polygon including a plurality of separated suspended blocks, each block shaped as a right trapezoid, and
   second electrodes arranged on a second layer, each second electrode patterned to include a plurality of sequentially connected second electrode elements that are generally shaped as elongated polygons,
   wherein the first electrodes on the first layer and the second electrodes on the second layer are arranged over one another surrounding a rectangular shaped electrode including a plurality of separated suspended blocks, each block shaped as a rectangle, the rectangular shaped electrode surrounded by the first electrodes and the second electrodes forming an octagon shape.

2. The touch panel of claim 1, wherein the first electrode elements on the first layer and the second electrode elements on the second layer are hexagon-shaped.

3. The touch panel of claim 2, wherein the first electrode elements on the first layer and the second electrode elements on second layer are hollowed-hexagon-shaped.

4. The touch panel of claim 3, wherein a first hollow area inside the hollowed hexagon of the first and second electrode elements and a second hollow area between the adjacent hollowed hexagons of the first and second electrode elements include suspended blocks.

5. The touch panel of claim 4, wherein the suspended blocks in each of the first hollow areas and the second hollow areas includes a plurality of suspended blocks.

6. The touch panel of claim 4, wherein the suspended blocks are coplanar with either one of the first layer or the second layer.

7. The touch panel of claim 1, wherein at least one of the electrodes includes an extra branch in a middle portion of the electrode.

8. The touch panel of claim 1, wherein the first electrodes on the first layer and the second electrodes on the second layer are coplanar with each other.

9. The touch panel of claim 1, further including a display, wherein the electrode array is positioned in front of the display.

10. The touch panel of claim 1, further including a display, wherein the electrode array is integrated into the display.

* * * * *